US 7,423,576 B2

(12) United States Patent
Sahinoglu et al.

(10) Patent No.: US 7,423,576 B2
(45) Date of Patent: Sep. 9, 2008

(54) SYSTEM AND METHOD FOR RADAR TRACKING USING COMMUNICATIONS PACKETS

(75) Inventors: Zafer Sahinoglu, Watertown, MA (US); Sinan Gezici, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 235 days.

(21) Appl. No.: 11/492,142

(22) Filed: Jul. 24, 2006

(65) Prior Publication Data

US 2008/0018521 A1  Jan. 24, 2008

(51) Int. Cl.
*G01S 13/42* (2006.01)
(52) U.S. Cl. ............................. 342/27; 342/28; 342/57; 342/125; 342/107; 342/108
(58) Field of Classification Search .................. 342/27, 342/28, 52, 57, 107, 108, 125, 189, 195
See application file for complete search history.

(56) References Cited

U.S. PATENT DOCUMENTS

| | | | |
|---|---|---|---|
| 5,280,294 A | 1/1994 | Hammerquist | |
| 5,323,161 A | 6/1994 | Gailer | |
| 5,444,451 A | 8/1995 | Johnson | |
| 5,912,644 A * | 6/1999 | Wang | 342/457 |
| 6,275,283 B1 | 8/2001 | Hasson | |
| 2006/0056375 A1* | 3/2006 | Koyama et al. | 370/342 |
| 2008/0018521 A1* | 1/2008 | Sahinoglu et al. | 342/27 |

OTHER PUBLICATIONS

U.S. Appl. No. 10/013,751, filed Nov. 13, 2001, Alan Schutz.
U.S. Appl. No. 10/898,119, filed Jul. 23, 2004, Richard Ormesher.
U.S. Appl. No. 10/469,188, filed Aug. 26, 2003, Dominique Poullin.
U.S. Appl. No. 10/868,675, filed Jun. 14, 2004, Paul Mohan.
I. Guvenc, Z. Sahinoglu, A. Molisch, and P. Orlik, "Non-Coherent TOA Estimation in IR-UWB Systems with Different Signal Waveforms," TR2005-132, Mitsubishi Electric Research Laboratories, Cambridge, MA, USA, Dec. 2005.

* cited by examiner

*Primary Examiner*—John B Sotomayor
(74) *Attorney, Agent, or Firm*—Dirk Brinkman; Clifton D. Mueller; Gene V. Vinokur

(57) ABSTRACT

According to the invention, IEEE 802.15.4a packets are used for communications, ranging and passive radar (detecting changes/motions, tracking objects in the environment) functionality. Changes and motions in the environment are detected by exploiting the specific preamble structure of the IEEE 802.15.4a packets. A sequence of packets transmitted through an environment is received. Each packet includes a preamble. The preamble in each packet is despread to update a reference multipath profile and to obtain a current multipath profile for a currently received packet. The reference multipath profile is compared with the current multipath profile to detect an object in the environment.

19 Claims, 13 Drawing Sheets

Fig. 3
Prior Art

SYSTEM AND METHOD FOR RADAR TRACKING USING COMMUNICATIONS PACKETS

FIELD OF THE INVENTION

This invention relates generally to processing packets in wireless communications networks, and more particularly to receiving data, estimating ranges, and detecting objects using the packets.

BACKGROUND OF THE INVENTION

Joint Ranging and Data Communication

An emerging IEEE Draft P802.15.4a/D3, April, 2006 standard specifies the use of communication packets for conveying data and determining a range between two radio transceivers. It is likely that the standard will use ultrawideband (UWB), radio signals operating in an unlicensed spectrum of about 3.1 GHz to 4.9 GHz where an actual unlicensed band is 7,500 MHz wide.

The packet exchange sequence is shown in FIG. 1. A transceiver-1 (TRCVR) 140 transmit a data packet 110 to a transceiver-2 150. Upon receiving the data packet 110, the transceiver-2 150 transmits an acknowledgment packet (ACK) 120 to transceiver-140. Optionally, the transceiver-2 150 can also transmit a timestamp packet (TS) 130. The TS packet 130 includes a time the packet 110 was received and a time the packet 120 was transmitted. After exchanging packets 110, 120 and 130, the transceiver-1 can determine the range to transceiver-2 by calculating the time traveled by the data packet 110.

As shown in FIG. 2, the IEEE standard IEEE Draft P802.15.4a/D3, April, 2006, specifies a structure of the data range packet 110 that is used for both data communication and ranging. The data packet 110 includes synchronization header (SHR) 200, physical (PHY) header 210 and payload 220. The SHR header 200 includes a preamble 230 and start of frame delimiter (SFD) 240. The preamble 230 includes repetitions of a perfectly balanced ternary sequence (PBTS) $S_i$ 250.

As shown in FIG. 3, the IEEE Draft P802.15.4a/D3, April, 2006 specifies eight different sequences of length 31 codes for $S_i$ 250.

As shown in FIG. 4A, the $S_i$ 250 is a sequence includes ternary symbols of +1 420, -1 430, or 0 440, and has a perfect periodic autocorrelation 450 property in a sense that sidelobes between the autocorrelation peaks 460 are zero as shown in FIG. 4B.

As shown in FIG. 4C, the symbol $S_i$ 250 and a pulse repetition interval (PRI) 410 are input to a pulse shaper 470 before transmission. The pulse shaper 470 outputs a continuous time waveform s(t) 480, which can be expressed as follows for the preamble 230

$$s(t) = \sum_{k=1}^{L_i} S_i(k) p(t - k.PRI),\quad (1)$$

where $L_i$ indicates the length of $S_i$ and p(t) is the ultra-wideband pulse waveform. Each pulse in s(t) is separated from the next pulse by the PRI 410. Each peak of the autocorrelation of s(t) is separated from the next peak by one symbol duration $T_s$ $$T_s = L_i \cdot PRI \quad (2)$$

The symbol duration $T_s$ corresponds to an interval of 31 samples 260 ($L_i$=31).

Conventional Radar

US Publication 20020109624 describes a system including a sensor unit having at least one antenna for transmission of a signal into an area. Any intrusion in the area is detected upon a change in the waveform received by the antenna. A received signal is transmitted from the sensor unit to a control unit to determine the movement of an intruder. Utilization of a plurality of sensor units allows the user to obtain additional information on the speed and location of the intruder. Additionally, as with conventional security systems, that prior art system can provide an electrical signal to activate a sound and/or light transceiver to attract the attention of the intruder and warn others of the intruder's presence. That system only functions as an ultra-wideband radar and does not provided for data communication.

US Publication 20060017608 describes a method and system for reducing clutter interference in a radar-responsive tag system. A radar device transmits a series of linear-frequency-modulated pulses and receives echo pulses from nearby terrain and from radar-responsive tags that may be in the scene. Tags in the vicinity of the radar are activated by the pulses. The tags receive and re-modulate the radar pulses. Tag processing reverses the direction, in time, of the received waveform's linear frequency modulation. The tag retransmits the re-modulated pulses. The radar uses a reversed-chirp de-ramped pulse to process the tag's echo.

Passive Radar

Passive radar detects changes in an propagation environment due to a presence of a target object. In a typical passive radar system, passive sensors receive signals emitted by target objects.

U.S. Pat. No. 6,275,283 uses passive ranging to a source with a known spectral emission to cue active radar system. Optical multiple passive systems (PS) are employed. The PS provides range and rate information to an active radar system. By this way, the active radar can achieve better resolution with fewer transmissions.

Another passive system is described in U.S. Pat. No. 5,444, 451. Passive means for single site radio location, which uses a single passive radar transceiver with a couple of sensors to determine the location of the target object. By measuring the inter-sensor delay times, the direction of arrival (DOA) of the target object's signal can be determined for positioning purposes.

US Publication 20040257270 describes a passive radar receiver with an array of antennas for an OFDM received signal comprising frames of symbols, each emitted on coded orthogonal carriers. After formatting received signals into digital symbols, dummy signals from dummy OFDM emitters at different distances from and in different directions relative to the receiver are generated and added to the signals picked up by the antennas. The modified received signals are filtered by means of inverse covariance matrices in order to eliminate at least unwanted zero Doppler effect signals and to provide an isotropic reception diagram without blind sector of direct path being generated and by detecting mobile target objects along the direct path.

U.S. Pat. No. 5,323,161 describes a method of assessing radar pulses. A passive radar system can distinguish pulses coming from a target object from pulses from other sources. Confidence values are calculated for the received pulses to identify the pulses of the target object without the need for any reference pulse. By this technique, a certain target object can be detected from its pulse structure.

U.S. Pat. No. 5,280,294 uses passive mono-pulse ranging to a non-cooperative emitter and non-emitting object. In a passive radar system, the range to a target object and to non-cooperative scanning radar is estimated. The PS component consists of a passive antenna array with beam-forming and a switching matrix to provide separate outputs for each of the object and emitter.

US Publication 20050275582 describes a bi-static continuous wave radar system and a related method for detecting incoming threats from ballistic projectiles. The radar system includes a remote source of RF illumination. A first receiving channel acquires direct path illumination from the source and provides a reference signal. A second receiving channel acquires a scatter signal reflected by a projectile. A processor coupled to each receiver corrects scatter signal Doppler offset induced by relative source motion, isolates narrowband Doppler signals to derive signatures characteristic of the projectile, and by executing appropriate algorithms, compares the derived signatures to modeled signatures stored in memory. If the comparison yields a substantial similarity, then the processor outputs a warning signal sufficient to initiate defensive countermeasures.

SUMMARY OF THE INVENTION

A single communication packet is used for three purposes:
1) to convey data,
2) to determine a range between two transceivers, and
3) to detect changes in an environment due to a target object.

A sequence of packets transmitted through an environment are received. Each packet includes a preamble. The preamble in each packet is despread to update a reference multipath profile and to obtain a current multipath profile for a currently received packet. The reference multipath profile is compared with the current multipath profile to detect an object in the environment.

BRIEF DESCRIPTION OF THE DRAWINGS

FIG. 3 is a block diagram of length 31 ternary sequences with perfect periodic autocorrelation functions according to the emerging IEEE 802.15.4a standard for use in each packet preamble;

DESCRIPTION OF THE PREFERRED EMBODIMENT

According to an embodiment of our invention, a communication packet with a single structure is used for conveying data, determining a range between two transceivers, and detecting changes in an environment due to presence of a target object.

Figure 6A:
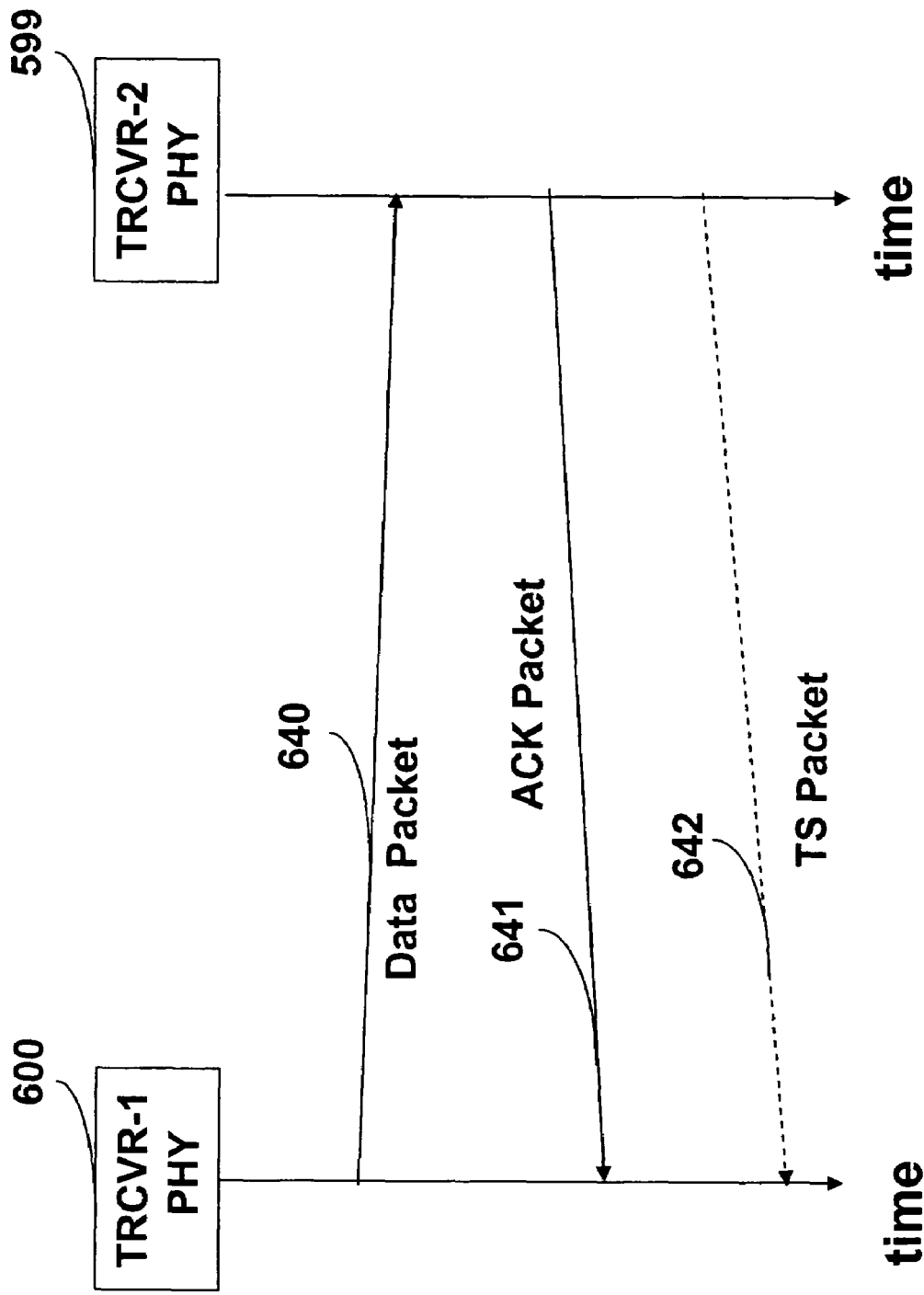
FIG. 6A is a timing diagram of a packet exchange according to an embodiment of the invention.

As shown in FIG. 6A, a first transceiver-1 (TRCVR) 600 transmits a data packet 640 to a second transceiver-2 599. The first transceiver-1 also records the time of transmittal. Upon receiving the data packet, the second transceiver-2 599 transmits an acknowledgment packet (ACK) 641 to the first transceiver-1 600. Optionally, the transceiver-2 599 can also transmit a timestamp packet (TS) 642. The TS packet includes a time the data packet was received and a time the ACK packet was transmitted. After exchanging packets, the first transceiver-1 can determine the range to transceiver-2 by calculating the time traveled by the packets. The range is based on half the round trip time.

It should be noted, that the TS packet may not be required, if the range estimate can be approximate, or the internal delays for packet turn-around are known, or the clocks of the transceivers are substantially synchronized.

Figure 6B:
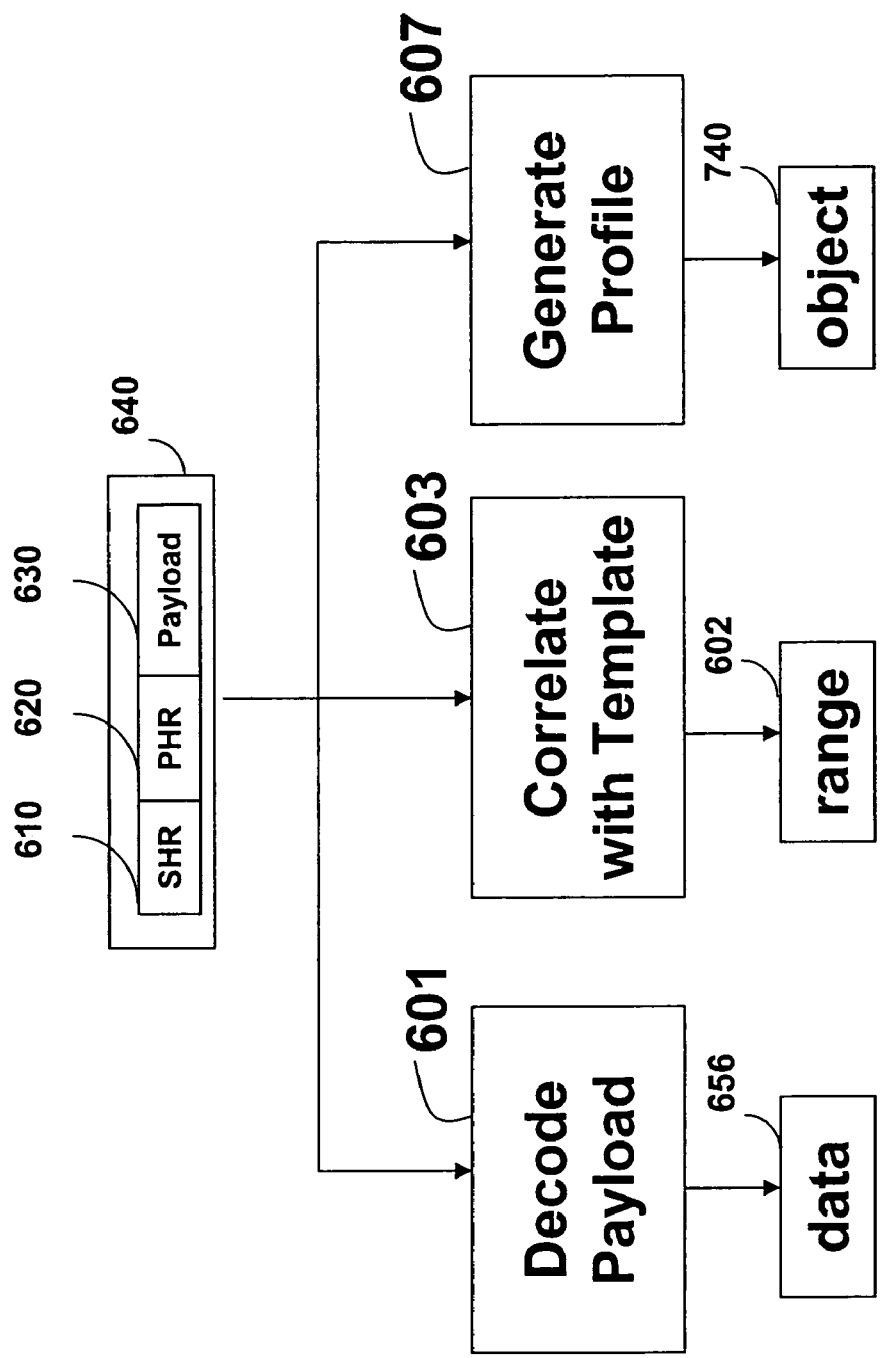
FIG. 6B is a flow diagram of a method for processing a packet in a receiver according to an embodiment of the invention.

As shown in FIG. 6B, each packet 640 includes a synchronization header 610, a physical layer header 620, and a payload 630. It should also be noted that the overall structure and format of all of the packets is the same. The content of the packets can differ. Although the invention is described for IEEE 802.15.4a packets, the invention can be applied to any communications packet that has a periodic preamble for signal timing and receiver synchronization, see I. Guvenc, Z. Sahinoglu, A. Molisch, and P. Orlik, "Non-Coherent TOA Estimation in IR-UWB Systems with Different Signal Waveforms," TR2005-132, MITSUBISHI ELECTRIC RESEARCH LABORATORIES, Cambridge, Mass., USA, December 2005, incorporated herein by reference.

The packet is decoded 601 to obtain data 656. The packet is correlated with a first template to estimate a time of arrival of the packet, and to determine a range 602 between the first and second transceivers. A multipath profile of the packet is generated 607. The multipath profile can be generated from all or part of the preamble in one or more received packets transmitted as a temporal sequence.

Typically, parts of the preamble(s) are averaged. By comparing multipath profiles separated over time in the sequence of packets, it becomes possible to detect one or more object 740, see FIG. 7B, in the environment in which the packets are transmitted, as well as the movement of the object, e.g., location, speed, direction of travel. For example, the preamble in a first received packet establishes a 'reference multipath profile'.

Then, each current multipath profiles obtained from the preambles in each subsequent packet can be compared with the reference multipath profile for the purpose of passive radar applications as described in greater detail below. The reference multipath profile can be updated as each subsequent packet in the sequence is received.

Figure 6C:
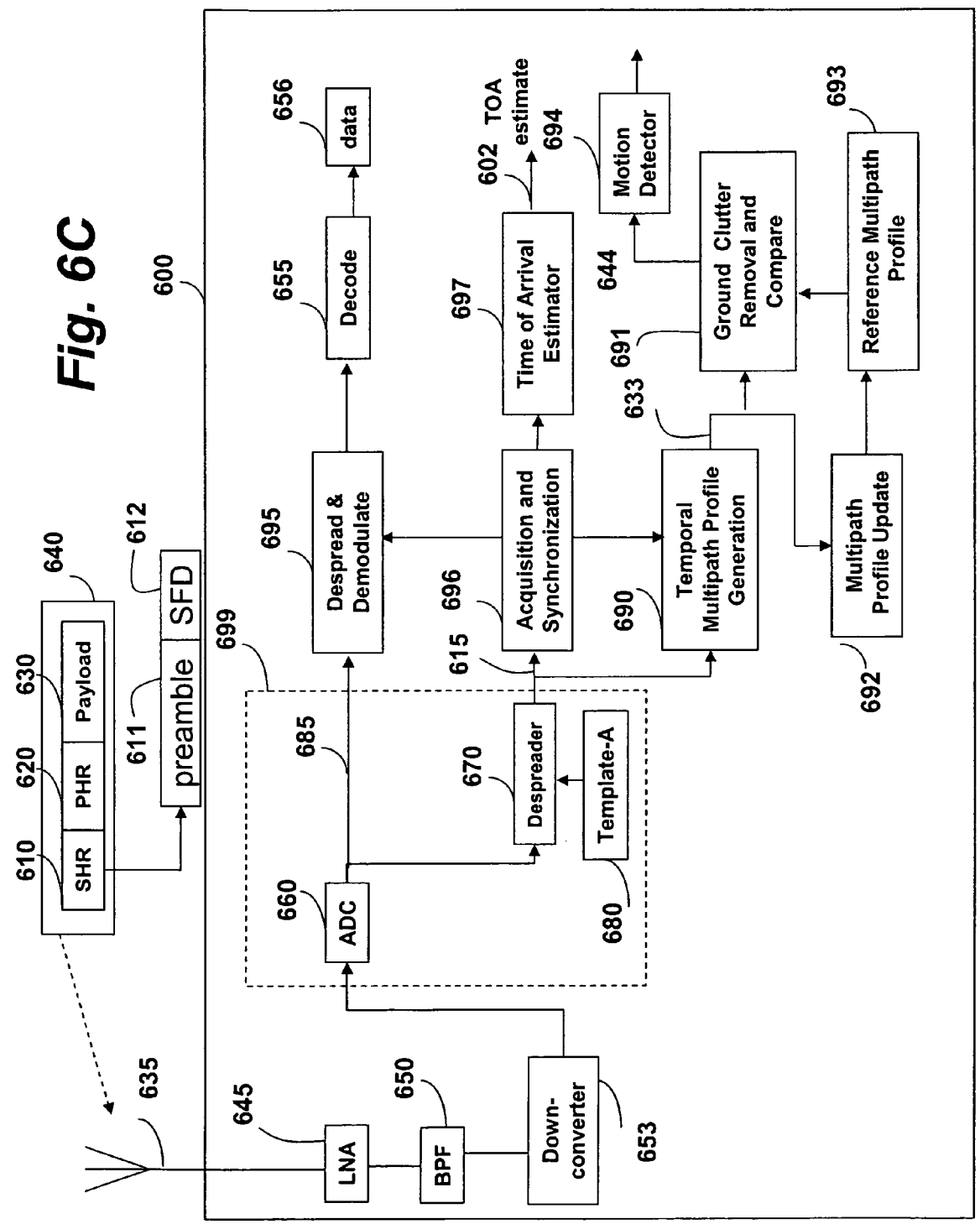
FIG. 6C is a block diagram of a structure of a packet and a receiver for combined ranging, communication and passive radar according to an embodiment of the invention.

As shown in FIG. 6C, each packet 640 includes the synchronization header (SHR) 610, the physical header (PHR) 620, and the payload 630. The SHR includes a preamble 611 and a start of frame delimiter (SFD) 612. The structure of the packets is compliant with an emerging IEEE 802.15.4a standard. The sequence of packets is received by the receiver portion 600 of the various transceivers. It should be noted, that the receiver portion of each transceiver is identical.

Typically, the receiver 600 includes an antenna 635, a low noise amplifier (LNA) 645, a band-pass filter (BPF) 650, and a downconverter 653 to convert the received RF signal to a baseband signal. The block 699 performs coherent processing to obtain signal samples.

The baseband signal is converted to a digital signal by an ADC 660 with a sampling rate of $R_A$. Output samples 685 of the ADC 660 are fed to a "despreader and demodulater" block 695, which performs data estimation using the timing information from an "acquisition and synchronization" block 696, which uses the preamble in the synchronization header. The output of block 695 can be used to decode 655 the payload of the packet to obtain data 656.

The output 685 of the ADC 660 is also used for acquisition and passive radar applications according to the invention. Therefore, the signal samples 685 are despread (correlated) 670 with a first template-A 680. The resulting digital signal y(n) 615 is sent to the "acquisition and synchronization" block 696 and a "temporal multi-path profile generation" block 690. The first template-A 680 is expressed as $$s_{temp,A}(n) = \sum_{k=1}^{L_i} S_i(k) p\left(\frac{n}{R_A} - k.PRI\right), \quad (3)$$

see also Equations 1 and 2 above for variable definitions.

The invention is not restricted to the structure of block 699 shown in FIG. 6C.

The "acquisition and synchronization" block 696 estimates the timing parameters of the signal by detecting the peaks of the despreader output 615. The detected peaks are used by the time-of-arrival estimator 697 to estimate a time of arrival 602 of the packet 640. The time of arrival information 602 can be used for ranging, i.e., to determine the distance between the two tranceivers.

An output z(n) 633 of the temporal multipath profile generator 690 can be expressed as $$z(n) = \frac{1}{N_{sym}} \sum_{j=0}^{N_{sym}-1} y(n + jT_s R_A), \quad n = 0, 1, \ldots, T_s R_A - 1, \quad (4)$$

where y(n) denotes the despreader output 615, $T_s$ is the symbol time, and $N_{sym}$ is the number of sequences $S_i$ in the preamble 611.

After ground clutter removal block 691, the current temporal multipath profile 633 is compared with a reference multipath profile 693. The comparison can be done in a number of ways. The entire profiles can be compared, or the reference profile can be subtracted from the current profile to obtain a difference signal.

The temporal multipath profile 633 is also used by the multipath profile update block 692 to update the reference multipath profile 693 periodically or as each packet is received. After removing the ground clutter, the remaining signal is the target profile 644, which can be analyzed by a motion detector 694 to track and identify target objects in the environment. The analysis can use a fast Fourier transform (FFT). If the motion is suspected of being periodic, for example, a chest expanding and contracting during breathing, or the gait of a person walking, then some form of sinusoidal analysis can be used.

Figure 6D:
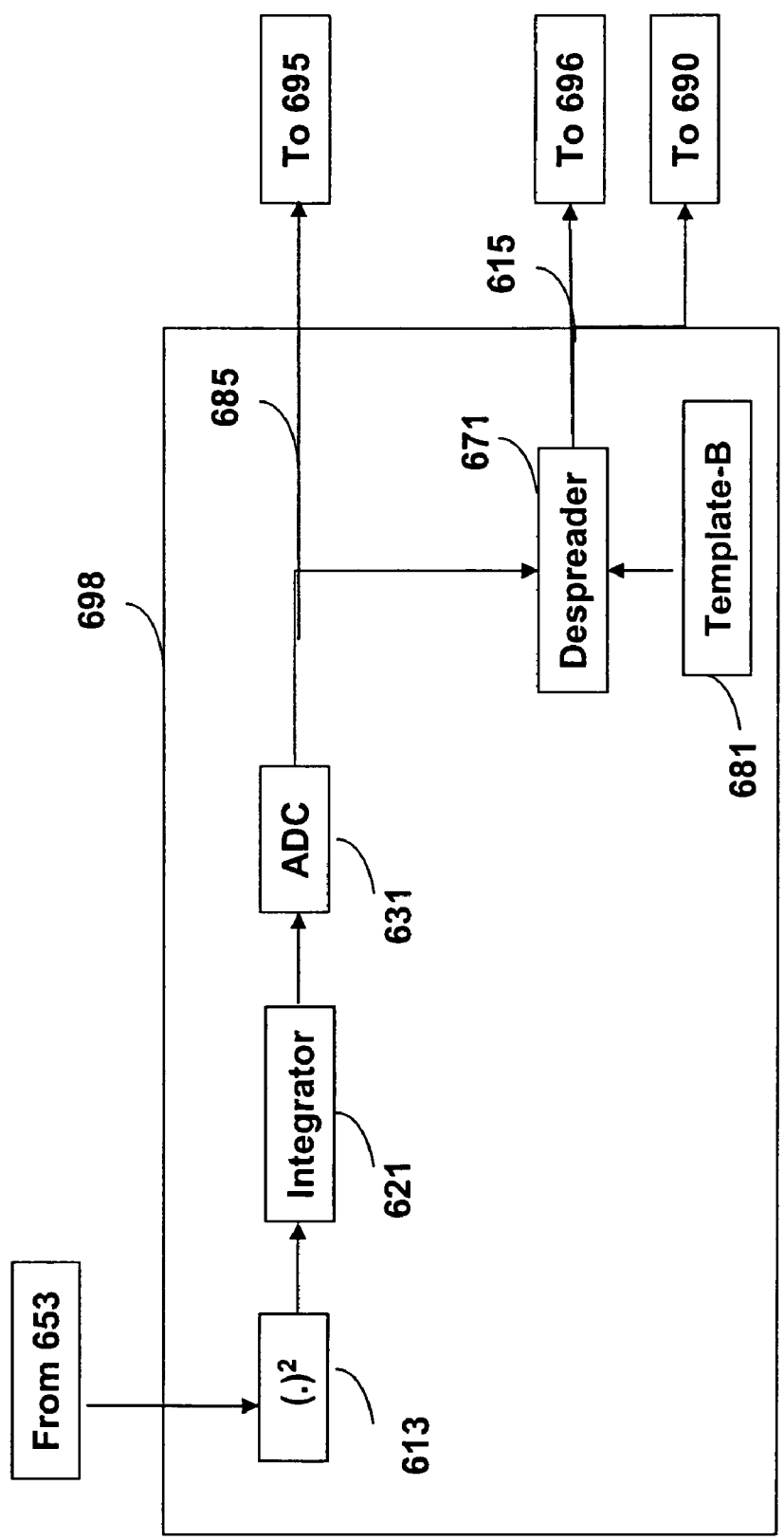
FIG. 6D is a block diagram for a non-coherent processing block.

FIG. 6D shows an embodiment where the signal samples 685 are obtained by using non-coherent processing 698. Specifically, the output of the BPF 650 can be squared by block 613, and then the squared values can be integrated 621. Then, an output of the integrator 621 is sampled by the ADC 631. The ADC outputs 685 are sent to the "despread and demodulate" module 695, despread by the despreader 671 using a template-B 681, and sent to "acquisition and synchronization" block 696 and to the "temporal multipath profile generation" block 690.

The second 'mismatched'-template 681 uses the perfect periodic autocorrelation property of the sequence $S_i$ in the preamble 611, formulated as follows $$s_{temp,B}(n) = \sum_{k=1}^{L_i} (2|S_i(k)| - 1) p\left(\frac{n}{R_B} - k.PRI\right), \quad (5)$$

where $R_B$ is the sampling rate of the ADC 631 in FIG. 6D.

Figure 7A:
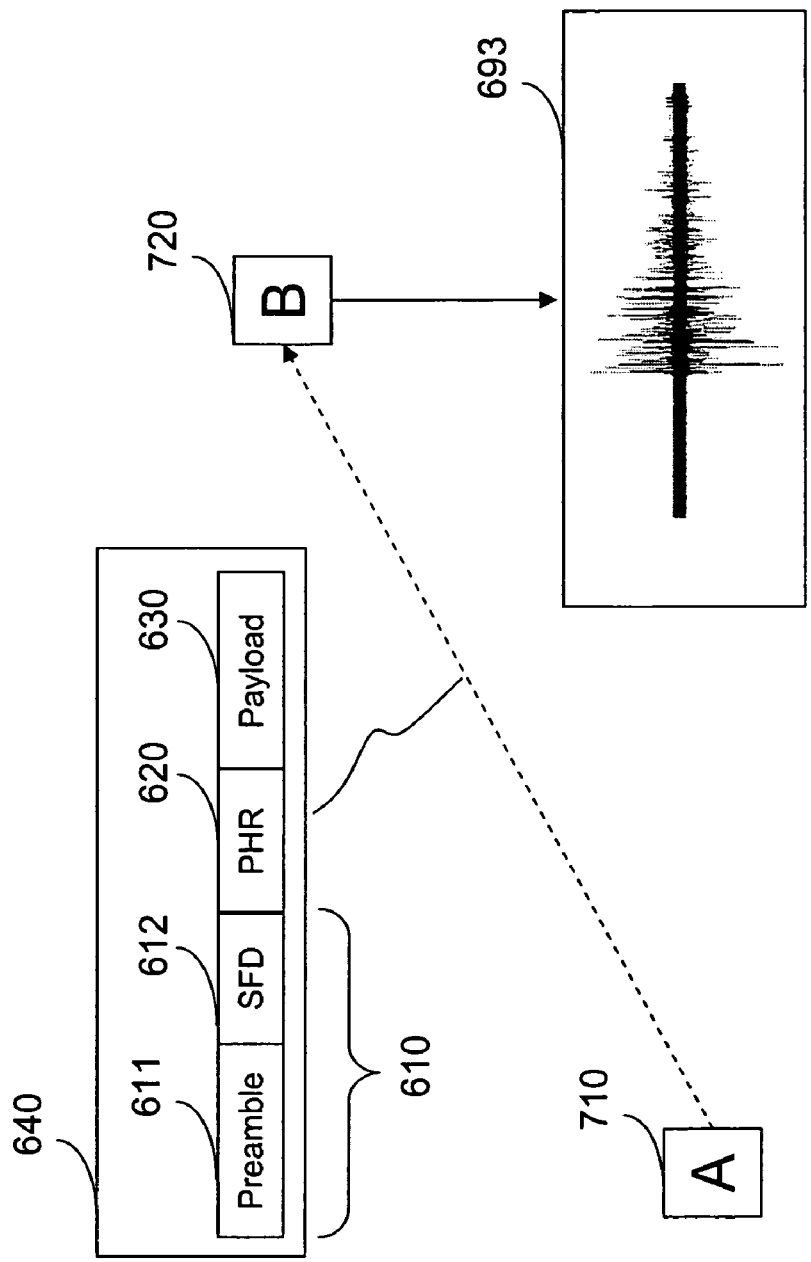
FIGS. 7A-7B are diagrams show changes of a multi-path profile of a wireless propagation channel due to a presence of a target object in an environment.
Figure 7B:
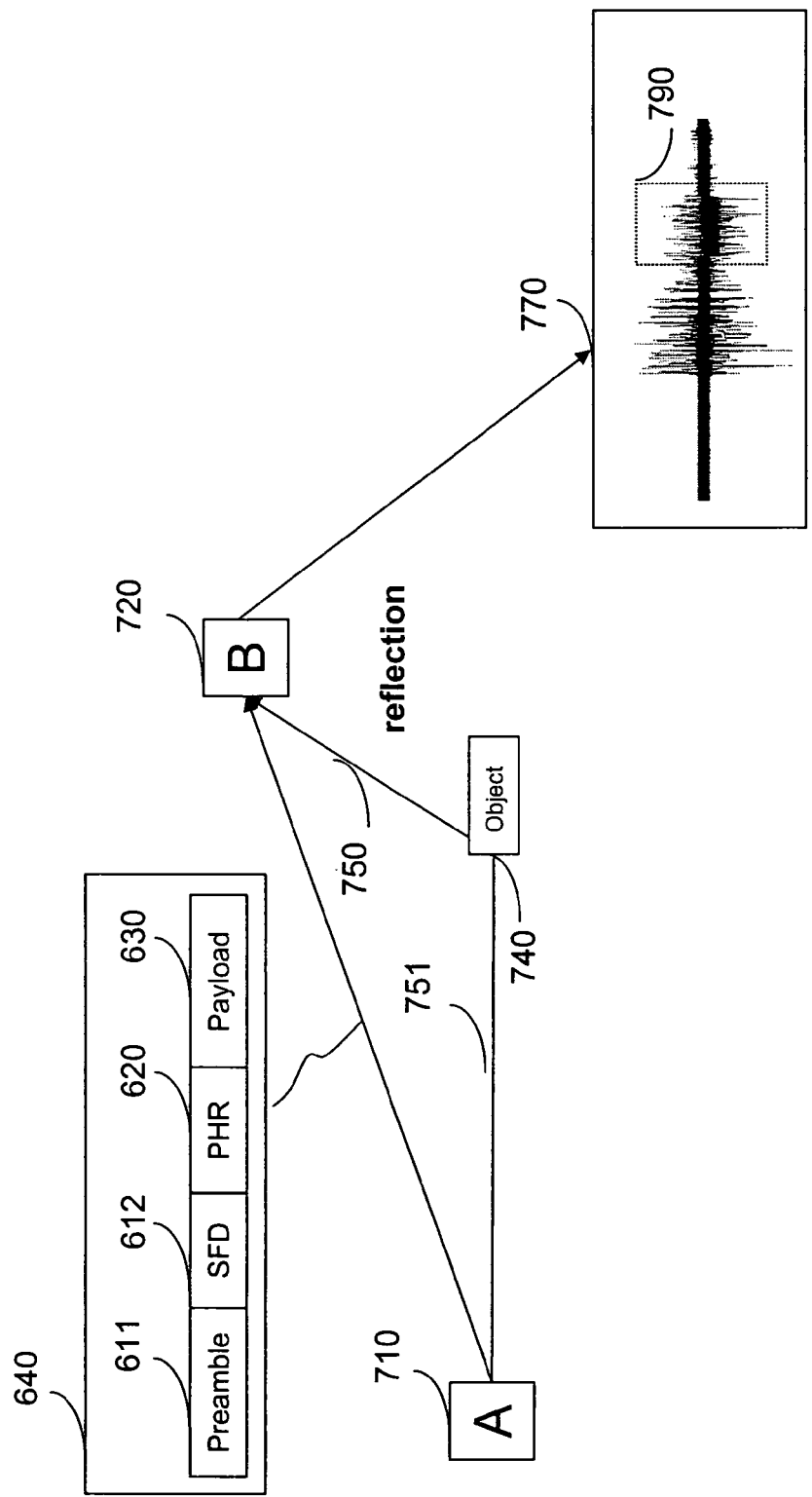

As shown in FIGS. 7A and 7B, $N_{sym}$ observations of the multi-path profiles of several successive packets can be combined, e.g., by averaging, to obtain a reliable temporal reference multi-path profile 693 of the channel between the transceiver A 710 and the transceiver B 720.

FIGS. 7A-7B show the passive radar capability of the receiver 600 according to the embodiments of the invention. In FIG. 7A, a transceiver A 710 transmits the packets 640 to a transceiver B 720. Using the preamble 611 of the received packet(s) 640, the transceiver B 720 extracts the multipath profile of the environment.

For each received packet, the transceiver B 720 updates the multipath profile and compares it to the reference profile 693 to detect/locate/track objects 740 in the environment. For example, as shown as shown in FIG. 7B, the presence of the object 740 causes an additional signal path from transceiver A 710 to transceiver B 720 compared to the initial reference multipath profile 693. A packet transmitted from transceiver A 710 traverses a link 751, reflects from the object 740, and reaches transceiver B 720 after traversing link 750. This additional signal path 790 can be observed in the multipath profile 770. Transceiver B 720 compares this multipath profile 770 with its reference multipath profile to provide a passive radar capability.

It should be noted that there can be multiple reflected paths and multiple objects in the environment that can be detected by the method as described above.

Radar Pulse Train

Conventional Radar and Clutter Removal

Figure 5:
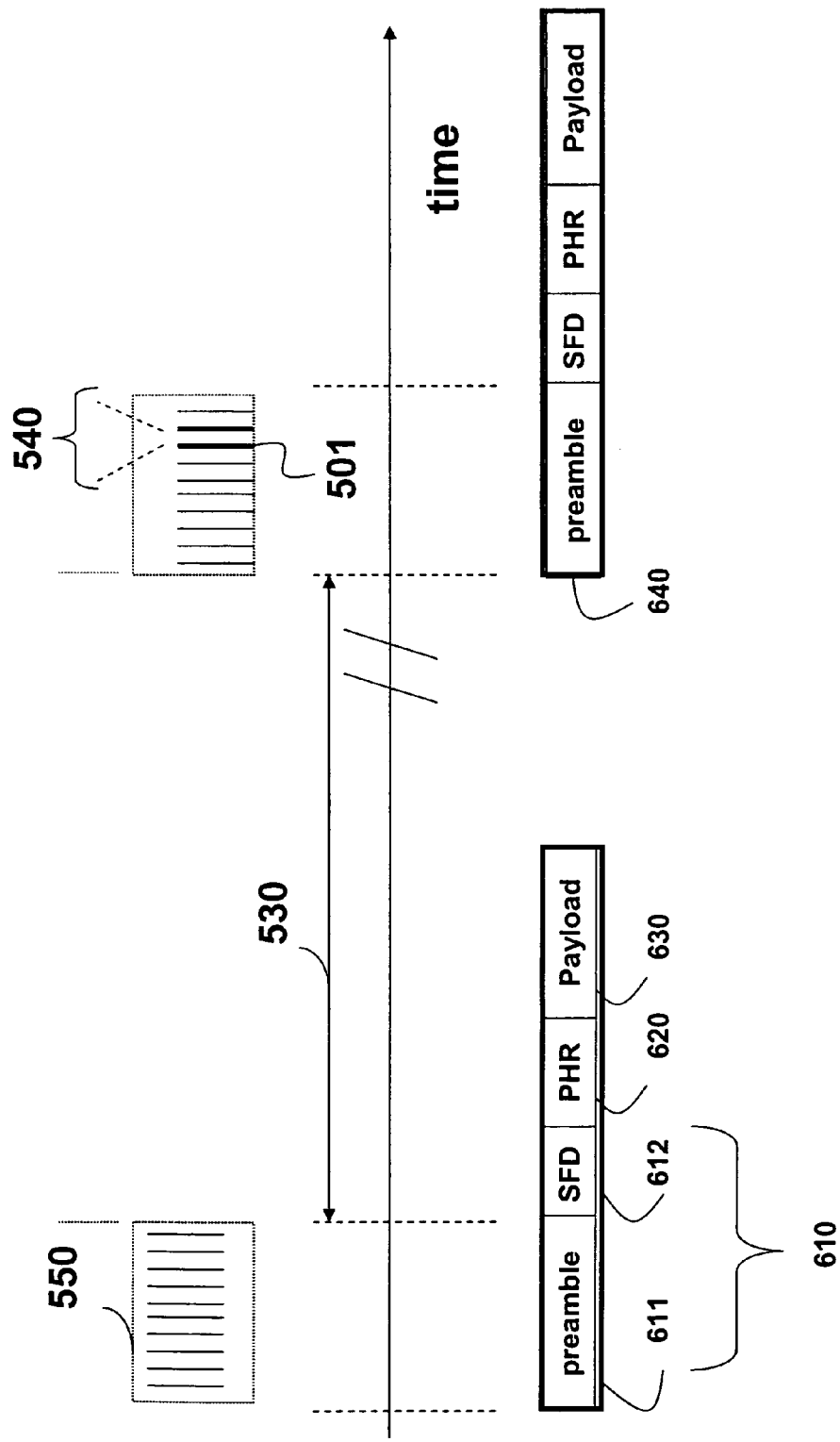
FIG. 5 is a timing diagram of a radar signal pattern that uses train of pulses with a silent period between consecutive trains of pulses formed by a sequence of packets according to an embodiment of the invention.

As shown in FIG. 5, radar signals are typically in the form of a train or 'bursts' 550 pulses. Each pulse 501 can be modulated with a sinusoidal wave or a chirp waveform. An inter-pulse interval 540 determines a resolution of the radar ranging. Between each train of pulses 550, a silent period 530 facilitates the ranging. The received pulses in the pulse train can be accumulated to improve a signal to noise ratio (SNR) and to remove the ground clutter. Different pulse trains can detect changes in the range.

Surprisingly, as shown in FIG. 5, the sequence of packets 640 according to the invention 'mimics' a conventional radar signal, although at a much finer resolution.

Figure 1:
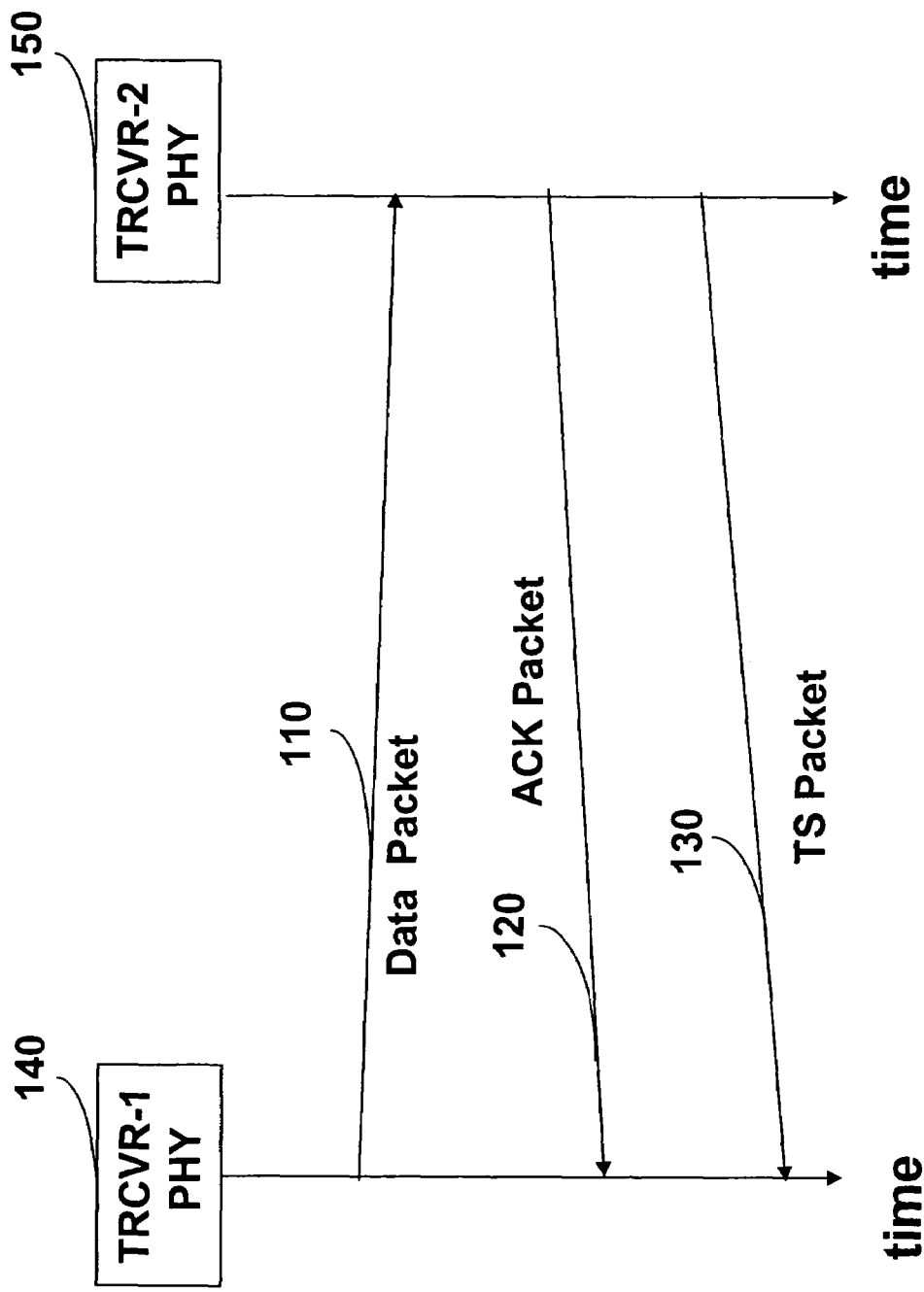
FIG. 1 is a timing diagram of a packet exchange according to an emerging IEEE 802.15.4a standard.
Figure 2:
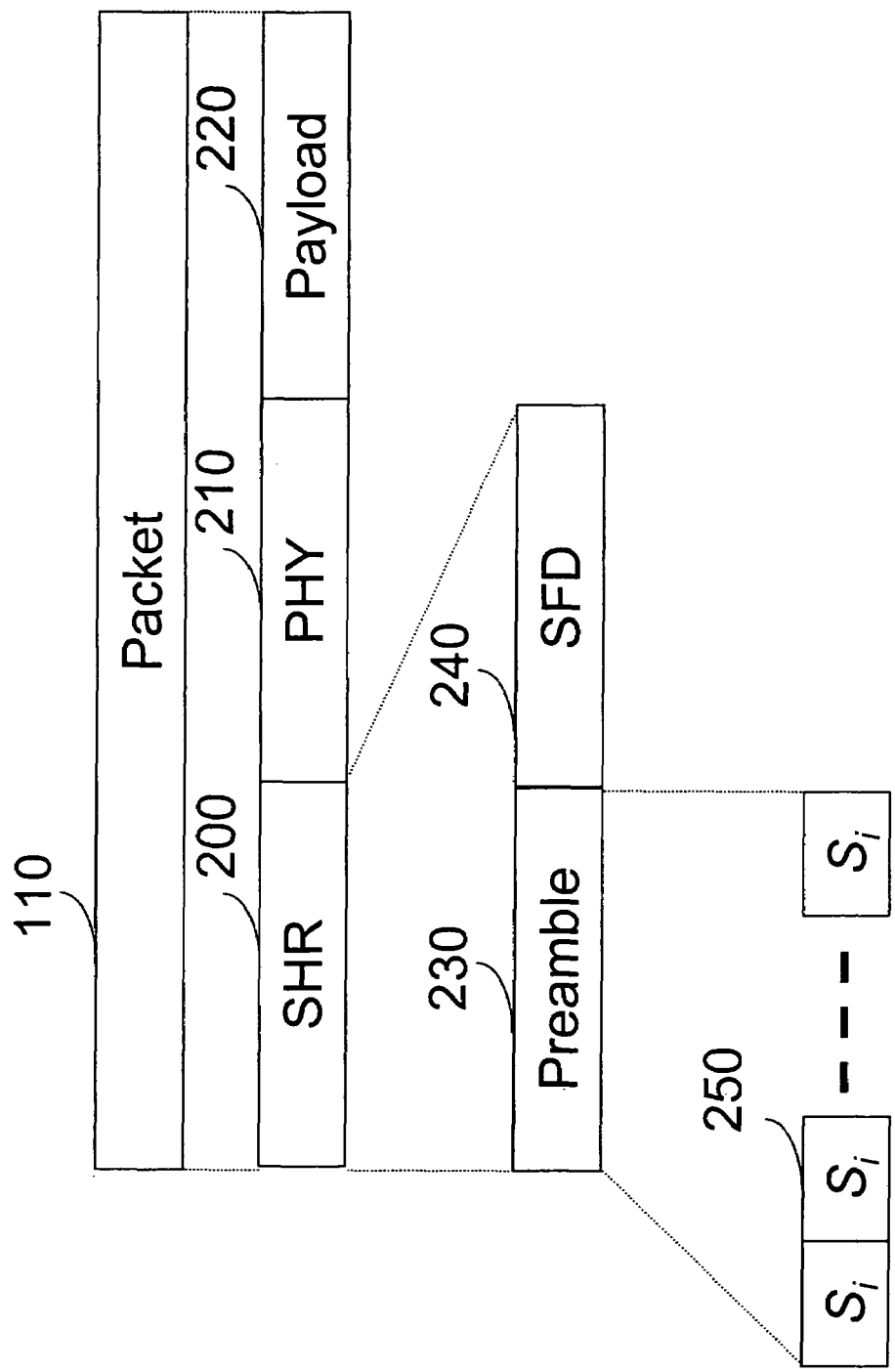
FIG. 2 is a block diagram of a packet structure for joint for ranging and data communication by an emerging IEEE 802.15.4a standard.
Figure 3:
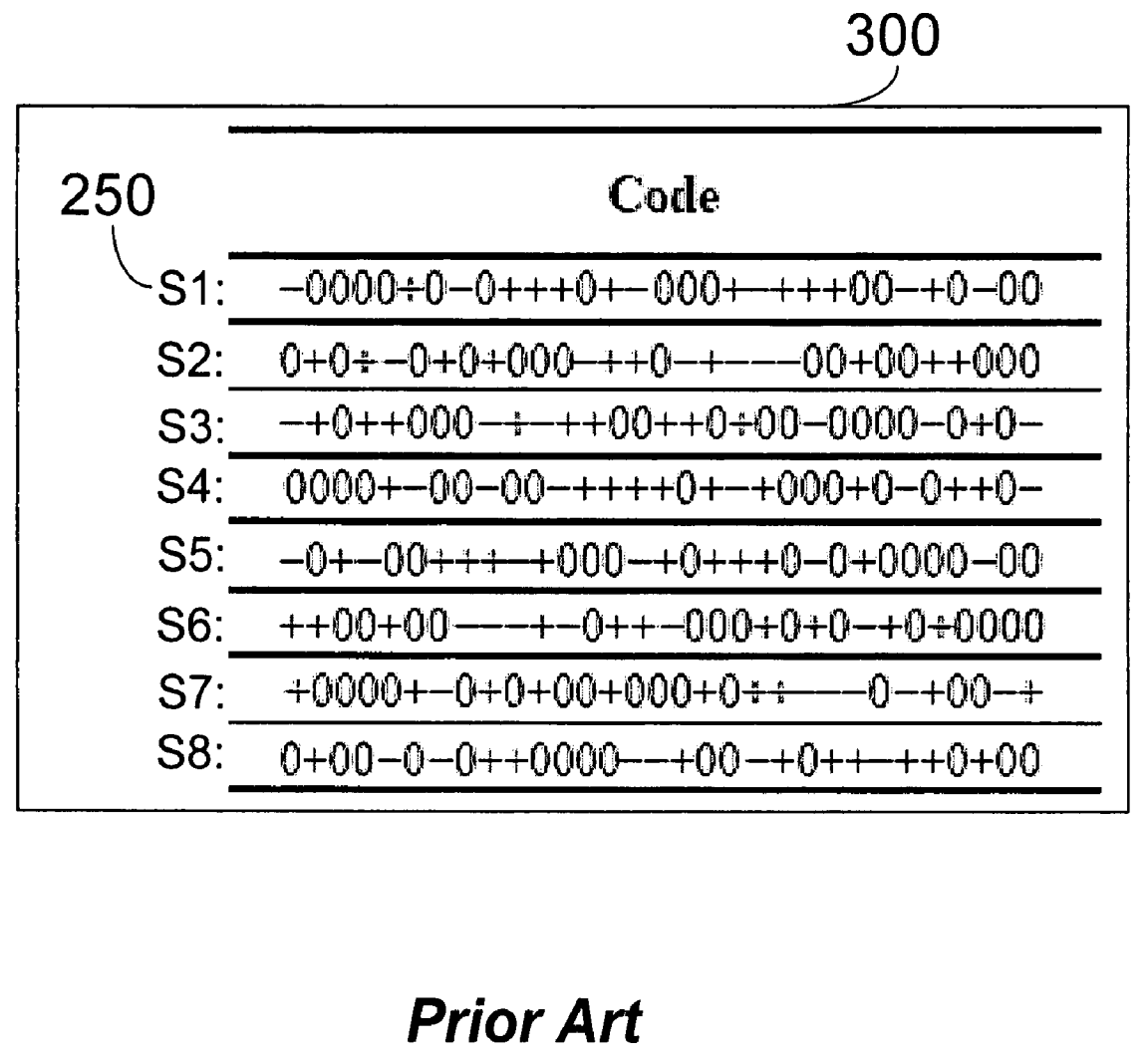
Figure 4A:
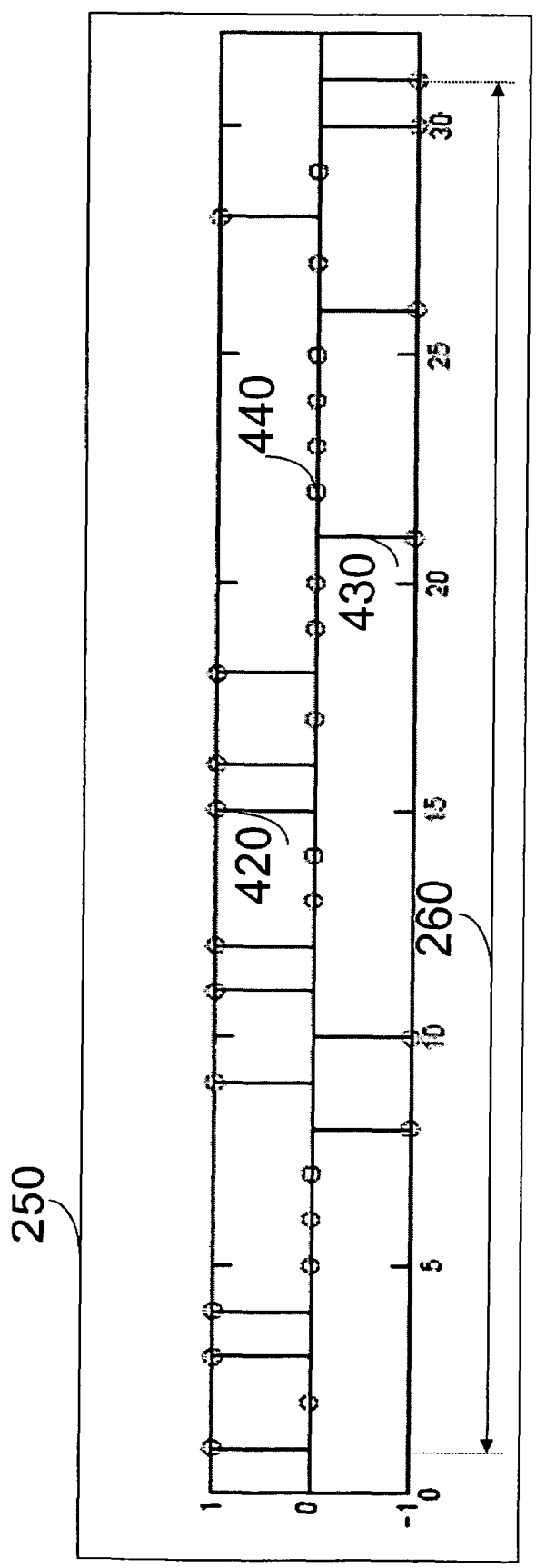
FIG. 4A-4B are timing diagrams of the length 31 ternary sequences of FIG. 3.
Figure 4B:
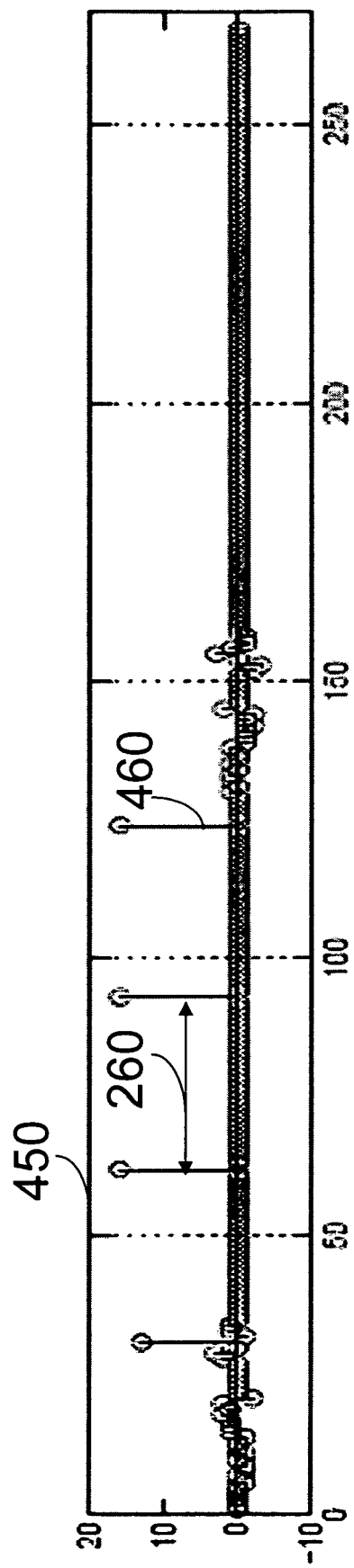
Figure 4C:
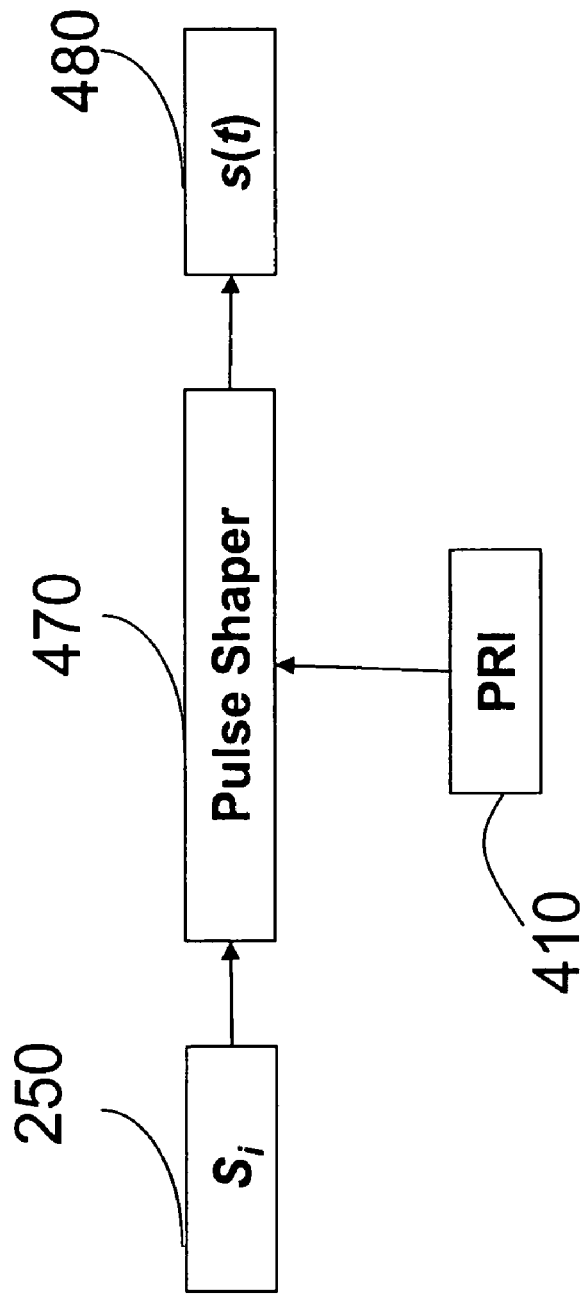
FIG. 4C is a block diagram of a prior art pulse shaper.

The symbols in the preamble 611 of each packet 640 form the train of pulses, see FIGS. 2 and 3. However, for a UWB signal, the width of the pulses is measured in terms of a very small number of nanoseconds, typically about 2 nanoseconds or less. The time between pulses (PRI) is also small, e.g., 100 ns. This provides a much higher resolution than conventional radar. The remainder of the packet, i.e., the SFD, PHR, and payload, as well as the time between packets if any form the silent period 530.

Other Frequencies

A sub-GHz option of the IEEE 802.15.4a standard can be used to detect and track humans in an environment because the human body better reflects those frequencies.

EFFECT OF THE INVENTION

Because the invention combines concurrently communications, ranging and passive radar capabilities, a number of applications, e.g., surveillance and security, are made possible. For example, by using ranging and motion detection capabilities at the same time, intrusion detection can be performed and un-authorized people can be identified. If authorized people wear tags to perform ranging between the people and an access point, then people without tags can be detected using passive radar. Specifically, because the ranges to the authorized people are known, this information can be used by the passive radar part to distinguish unauthorized people with multipath profile detection.

Note that the invention is not restricted by the receiver structure shown in FIGS. 6C-6D. The invention applies to any IEEE 802.15.4a compatible structure. For example, signal can be converted to digital later than specified, and additional analog processing can be employed.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an object in an environment, comprising the steps of:
   receiving a sequence of packets transmitted through an environment, each packet including a preamble;
   despreading the preamble in each packet to update a reference multipath profile and to obtain a current multipath profile for a currently received packet; and
   comparing the reference multipath profile with the current multipath profile to detect an object in the environment.

2. The method of claim 1, in which a format of the packet is according to an IEEE 802.15.4a standard.

3. The method of claim 1, further comprising:
   determining a range between two transceivers from the sequence of pulses.

4. The method of claim 1, in which the preamble includes repetitions of a perfectly balanced ternary sequence.

5. The method of claim 1, further comprising:
   receiving data in the sequence of packets.

6. The method of claim 1, in which an overall structure and format of each packet is identical.

7. The method of claim 1, further comprising:
   detecting a location of the object.

8. The method of claim 1, further comprising:
   determining a speed of the object.

9. The method of claim 1, further determining a direction of travel of the object.

10. The method of claim 1, in which comparing detects a plurality of objects in the environment.

11. The method of claim 1, in which the object is detected passively.

12. The method of claim 1, in which each packet further includes a physical layer header, and a payload.

13. The method of claim 1, in which the packets are transmitted using a radio signal, and the radio signal is sampled coherently.

14. The method of claim 1, in which the packets are transmitted using a radio signal, and the radio signal is sampled non-coherently.

15. The method of claim 1, in which each multipath profile has a form $$z(n) = \frac{1}{N_{sym}} \sum_{j=0}^{N_{sym}-1} y(n + jT_s R_A), \quad n = 0, 1, \ldots, T_s R_A - 1,$$

where $N_{sym}$ a number of sequences of symbols in the preamble, $y(n)$ denotes an output of a despreader, $T_s$ is a symbol time, $R_A$ is a sample rate.

16. The method of claim 1, in which the multipath profiles in the sequence of packets are averaged to obtain the reference multipath profile.

17. The method of claim 1, further comprising:
    removing ground clutter from the multipath profiles.

18. The method of claim 1, in which the object reflects the packet.

19. A system for detecting an object in an environment, comprising:
    a receiver portion in a transceiver configured to receive a sequence of packets transmitted through an environment, each packet including a preamble;
    a despreader configured to despread the preamble in each packet to update a reference multipath profile and to obtain a current multipath profile for a currently received packet; and
    a comparator configured to compare the reference multipath profile with the current multipath profile to detect an object in the environment.

* * * * *